United States Patent [19]
Schwartz

[11] 3,821,006
[45] June 28, 1974

[54] PATCHING METHOD
[75] Inventor: Carl H. Schwartz, Toledo, Ohio
[73] Assignee: Dentsply International Inc., York, Pa.
[22] Filed: Apr. 16, 1971
[21] Appl. No.: 134,882

[52] U.S. Cl.................. 106/85, 106/105, 106/121
[51] Int. Cl................................................ C04b 9/04
[58] Field of Search ........... 106/105, 108.5, 121, 85

[56] References Cited
UNITED STATES PATENTS

| | | | |
|---|---|---|---|
| 2,479,504 | 8/1949 | Moore et al. | 106/121 |
| 2,522,548 | 9/1950 | Streicher | 106/121 |
| 3,202,520 | 8/1965 | Enoch | 106/121 |
| 3,525,632 | 8/1970 | Enoch | 106/105 |

FOREIGN PATENTS OR APPLICATIONS

| | | | |
|---|---|---|---|
| 593,172 | 6/1945 | Great Britain | 106/108.5 |

*Primary Examiner*—James E. Poer
*Attorney, Agent, or Firm*—Owen and Owen, John C. Purdue, James D. McNeil

[57] ABSTRACT

A method of repair using a two component system of a reactive component and an inert particulate aggregate. The reactive component is a mixture of an acid phosphate salt and MgO particles and the aggregate can be sand and silica. The MgO particles are minus 100 mesh and have a bulk density of at least 50 pounds per cubic foot. From 7-50 parts by weight of the reactive component are mixed with from 93-50 parts by weight of the aggregate. The proportion of the acid phosphate salt to MgO is maintained such that a continuous cementitious phase is formed during reaction to form magnesium phosphate and surrounds the aggregate and the remaining MgO particles. A workable slurry is formed by mixing the reactive component and the aggregate with sufficient water that the exothermic heat of reaction is such that the slurry cures to a solid having adequate compressive strength at an early cure age. The slurry is inserted in the defect which requires patching, is shaped as required, and is allowed to harden.

6 Claims, No Drawings

PATCHING METHOD

BACKGROUND OF THE INVENTION

Modern science with its chemical, petrographic, X-ray and spectrographic techniques has studied the phenomena of hydration, setting and hardening of mortars and concrete to elucidate the factors which influence the strength, bonding quality and working time of mortar and concrete compositions. These qualities are especially important where it is desired to use the mortar or cement composition to repair mortar, concrete, plaster and the like, ceramic ware or wood.

Materials such as corroded mortar and concrete, wood, ceramic, plaster and the like are often difficult to repair because of poor adhesion of the patch to the material. In repairing concrete and mortar for example, problems such as shrinkage and poor adhesion to the old concrete or mortar are aggravated when the concrete or mortar is metal reinforced; the patching material must not contain any chemical that will corrode the metal reinforcement. In addition, the patch may show strength deterioration or softening in warm weather. A further problem is the complicated procedure that is often necessary with most prior art patching compounds. Procedures involving prolonged curing times with controlled temperature and humidity, and carefully controlled amounts of a curing agent or accelerator are very inconvenient, especially when repairs must be made on a busy highway.

Phosphate cementitious compositions, such as those disclosed in U.S. Pat. No. 2,072,212 and 2,479,504 have been used as refractory investment materials and embedding masses. Such prior art compositions are known to develop high compressive strength and thermal stability when cured at elevated temperatures under humid conditions, e.g., in an autoclave. Molds using these compositions have been used successfully in casting $V_2A$ steels, gold, silver and other high temperature metals and alloys.

SUMMARY OF THE INVENTION

The present invention relates to a patching method which uses a two component mixture of a reactive component and an inert aggregate component.

The reactive component contains from 7-50 parts by weight of a mixture of minus 100 mesh MgO particles having a bulk density of at least 50 pounds per cubic foot and an acid phosphate salt. The relative proportions of the acid phosphate salt to MgO are such that the reaction between them forms a continuous cementitious phase of magnesium phosphate surrounding the aggregate and the remaining MgO particles. The reactive component is mixed with from 93-50 parts by weight of an inert aggregate such as, for example, sand and silica, of minus 20 mesh. The particle sizing of the aggregate is such that a workable slurry is formed when mixed with water. The relative proportions of the reactive component and inert component are sufficiently high that an aqueous slurry of workable consistency is heated by exothermic heat of reaction to a temperature sufficiently high that the patching slurry cures to a solid having adequate compressive strength at an early cure age.

Accordingly, it is an object of this invention to provide a low cost method of repairing concrete, mortar, wood, ceramic, plaster and the like.

It is also an object of this invention to provide a concrete, mortar, wood, ceramic, plaster and the like repair composition with an easily controllable hardening rate.

It is a further object of this invention to provide a concrete, plaster, mortar, wood and ceramic patching composition that produces a repair having adequate compressive strength and bond strength.

It is a still further object of this invention to provide a quick and economical method for repairing broken, spalled and corroded concrete, mortar, plaster and the like.

The instant invention will be more fully understood from the following Examples, which describe preferred specific embodiments. In the Examples, as elsewhere herein, the terms "percent" and "parts" refer to percent and parts by weight, unless otherwise indicated. In the procedure of each Example, a dry mix and water, at 70°–80°F., were mixed together at room temperature. All sizing is reported as standard mesh per linear inch, Tyler screen series.

EXAMPLE I

A patching mortar having the following composition was prepared by dry-mixing mono ammonium phosphate, magnesium oxide, sand and silica and adding water to the dry mix. The proportions are indicated below:

| | Parts by Weight |
|---|---|
| $NH_4H_2PO_4$ | 15 |
| MgO* | 10 |
| 30 to 40 mesh sand | 50 |
| 100 mesh silica | 25 |
| Water | 15 |

* Unless otherwise indicated, the MgO used in each of the following Examples had the grain sizing listed in Table I.

The ground calcined MgO used had the following grain sizing:

TABLE I

| | Percent |
|---|---|
| + 100 mesh | 1 |
| + 200 mesh | 2 |
| − 200 mesh | 98 |

The ground calcined MgO used in Example I and, except as otherwise indicated, in the following Examples was produced by firing magnesium hydroxide so that the ground material had a bulk density of 50 to 100 pounds per cubic feet. This can be accomplished by firing to 1,800°–2,300°C., for an appropriate time, longer firing being required at the lower temperatures and shorter firing at the higher temperatures.

The mortar slurry formed had a working or pouring time of slightly less than 6 minutes. Such a short set time is adequate for many uses, but must be increased if it is desired to work with a large amount of the patching mortar. An increase in the working or pouring time may be accomplished by the addition of a small amount of sodium chloride and/or by cooling the dry mix and water.

Samples 1 3/8 inches in diameter by 2 inches and 3 inches in diameter by 6 inches were prepared from the composition of Example I and were cured at room temperature for periods of 1 hour and 24 hours. The samples were then subjected to applied pressure, and the compressive strength of the samples measured. The samples cured for 1 hour had a compressive strength of 3,500 pounds per square inch; the samples cured for 24 hours had a compressive strength of 4,300 pounds per square inch.

EXAMPLE II

A patching mortar composition was produced as described in Example I. The composition was the same as in Example I, except that 2 percent of sodium chloride was added to the slurry composition. The working time of less than 6 minutes obtained in Example I was increased to 8 1/2 minutes by the addition of the sodium chloride. Samples were tested for compressive strength after a curing time of 2 hours and 24 hours. A compressive strength of about 4,000 and 4,300 pounds per square inch respectively, was obtained.

EXAMPLE III

A patching mortar composition was produced as described in Example I. The composition was the same as in Example I, except that 3 percent of sodium chloride was added to the mixture. The addition of the sodium chloride increased the working time to 10 minutes. Experimental results were similar to the results obtained in Example II; neither the 2 hour nor the 24 hour compressive strength of the samples was reduced by the addition of the sodium chloride.

Further tests indicated that when about 5 percent of sodium chloride was added to the patching mortar composition of Example I, the working time increased to 15 minutes. The 2 hour compressive strength was reduced by about 'percent, but the 24 hour compressive strength remained essentially unchanged. The high compressive strength of the patching mortar composition described in Examples I-III makes these compositions useful in repairing, for example, concrete subject to severe abuse such as a concrete roadway.

Magnesia (MgO) can be produced from magnesite ($MgCO_3$), a naturally occurring mineral deposit, or from chemically precipitated magnesium hydroxide produced by the "sea water" or "brine" process. The product known commercially as "dead-burned magnesite" is produced by "deadburning" the magnesia-containing compounds at a temperature above 1,450°C. to drive off chemically combined water and/or carbon dioxide. Heating at temperatures below about 1,450°C. produces a calcined magnesia known as 'caustic magnesia." Common commercial practice, when the starting material is precipitated magnesium hydroxide, involves a double burn procedure, with briquetting, to produce dense crystalline "dead-burned magnesite," in a form known as periclase. The bulk density of the magnesite is controlled by the briquetting pressure, and the time and temperature of firing. The more dense periclase has a higher bulk density, other factors being equal, and a lower reactivity. In general, burned MgO having a bulk density of at least about 50 pounds per cubic foot can be used in a composition according to the invention. Caustic magnesia is excluded by this limit, all grades of dead burned material and fused magnesia being included.

The principal chemical reaction which causes hardening of the patching mortar composition in Examples I-III is that between the mono ammonium phosphate and magnesium oxide:

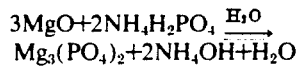

The theoretical amounts of magnesium and mono ammonium phosphate for the complete reaction to form magnesium phosphate are 26.81 percent and 73.19 percent, respectively. As will be explained in detail hereinafter, it is not feasible to use the reactive ingredients in this ratio. Because of the amount of heat produced in the exothermic reaction between the acid phosphate salt and magnesia, the method of the invention involves the use of an inert aggregate component to control the reaction of the reactive component. For example, sand and silica and combinations thereof are used as the inert component. Each of these aggregates functions as a diluent and helps to absorb part of the heat of reaction, thereby facilitating use of the patching method. It has been suggested that a superficial reaction takes place between the MgO and phosphate ions to form a weak silico-phosphate bond. Inert as used herein does not preclude the possibility of such a superficial reaction to form a minor amount of such silico-phosphate bond.

The MgO particles are relatively insoluble in comparison with acid phosphate salts. It is believed that the reaction between the MgO particles and the phosphate salt is essentially a surface phenomena. Although the surface of the individual MgO particles is available to react with the acid phosphate salt to form magnesium phosphate, the nuclei of the minus 100 MgO particles remain essentially unreacted. In order to obtain sufficient cured strength, the magnesium phosphate produced must form a continuous cementitious phase which surrounds the unreacted MgO particles and the inert aggregate component of the reaction mixture.

The rate of reaction between the acid phosphate salt and magnesium oxide is directly related to the particle size of the MgO, which indicates that the above postulated formation of magnesium phosphate is correct. For particles having a given bulk density, i.e., "dead-burned" under the same conditions of temperature and pressure, coarse-sized particles will react less rapidly than fine-sized particles. However, it is preferred not to use a coarse grain magnesia because of the possibility of insufficient reaction with the acid phosphate salt to form a cementitious phase surrounding unreacted MgO particles and the aggregate. As the MgO particle size is increased, the exotherm is decreased, reducing the strength of the cured slurry composition, other factors being equal.

EXAMPLE IV

A patching mortar was produced as described in Example I, using a somewhat coarser calcined MgO:

| | Parts by Weight |
|---|---|
| $NH_4H_2PO_4$ | 15 |
| MgO | 10 |
| 30 to 40 mesh sand | 50 |
| 100 mesh silica | 25 |
| Water | 15 |
| NaCl | 3 |

The ground calcined MgO used had the following grain sizing:

TABLE II

| | Percent |
|---|---|
| + 200 mesh | 8 |
| − 80 mesh | 99 |

The above mortar slurry had a set time of 16 minutes, as compared with a set time of 10 minutes obtained in Example III. The compressive strength obtained after samples were dried at room temperature for a period of 1 hour was less than 1,700 pounds per square inch; accordingly, the Example IV composition would be less desirable than that of Examples I through III as a highway patching material, but would be entirely satisfactory for plaster patching or for casting statuary.

In addition to controlling the particle size of the MgO which can be used in the method of the invention, it may be desirable to control the reaction rate of the reaction component and inert aggregate further by chilling the dry mix and water before mixing. By the use of such adjustments, a method of repair can be accomplished in which the patching material has an adequate reaction and working time and which will develop adequate strength at an early cure age. The amount of strength and working time needed will determine the method of repair according to the invention.

The magnesia used in the Examples had a bulk density in the range of 55–100 pounds per cubic feet (pcf). A bulk density of this magnitude indicates that the magnesite has a low reactivity, intermediate between the reactivity of caustic magnesia and a "dead-burned magnesite" having a bulk density of greater than 100 pcf. By varying the "dead-burning" or calcining conditions, a "dead-burned magnesite" having a greater bulk density and a lower reactivity may be produced, other factors being equal. The less reactive magnesite will react more slowly with the acid phosphate salt and give the composition a longer set time, accompanied by somewhat lower early strength of the magnesium phosphate.

EXAMPLE V

A patching mortar composition was produced as described in Example III, using the following composition:

| | Parts by Weight |
|---|---|
| $NH_4H_2PO_4$ | 15.00 |
| MgO | 12.50 |
| 30 to 40 mesh sand | 50.0 |
| 100 mesh silica | 22.50 |
| Water | 15.0 |
| NaCl | 3.0 |

The increase in the amount of MgO and decrease in the amount of silica present in the composition increased the compressive strength of samples dried for 1 hour to about 3,600 pounds per square inch. The working time of the mortar decreased from 10 minutes to about 5 minutes.

EXAMPLE VI

A patching mortar composition was produced as described in Example III, using the following composition:

| | Parts by Weight |
|---|---|
| $NH_4H_2PO_4$ | 15.0 |
| MgO | 15.0 |
| 30 to 40 mesh sand | 50.0 |
| 100 mesh silica | 20.0 |
| Water | 15 |
| NaCl | 3 |

The further increase in the amount of MgO and decrease in the amount of silica present in the composition increased the compressive strength of samples cured for 1 hour to about 4,200 pounds per square inch. The working time of the mortar decreased again, to slightly less than 4 minutes.

EXAMPLE VII

A patching mortar composition was produced as described in Example III, using the following composition:

| | Parts by Weight |
|---|---|
| $NH_4H_2PO_4$ | 13.75 |
| MgO | 10.0 |
| 30 to 40 mesh sand | 50.0 |
| 100 mesh silica | 26.25 |
| Water | 15 |
| NaCl | 3 |

The decrease in the amount of $NH_4H_2PO_4$ and increase in the amount of silica present in the composition produced a drastic decrease in the compressive strength of samples cured for 1 hour to 2200 pounds per square inch. The working time of the mortar remained the same: 10 minutes.

EXAMPLE VIII

A patching mortar composition was produced as described in Example III, using the following composition:

| | Parts by Weight |
|---|---|
| $NH_4H_2PO_4$ | 15.0 |
| MgO | 10.0 |
| 30 to 40 mesh sand | 50.0 |
| 100 mesh silica | 25.0 |
| NaCl | 3.0 |

To the above dry mix was added an equal quantity of a coarse aggregate known as Number 8 Stone. A 15 percent addition of water was then made, based on the weight of the above dry mix fraction. Samples cured for 2 hours had a measured compressive strength 4,300 pounds per square inch. Further tests indicate that if the ratio of stone to mix is increased up to 60:40, the compressive strength at 2 hours is reduced by about 15 percent.

The composition of Example VIII has been found to be useful where it is desired to undertake extensive repairs. Such a patching mortar composition would be efficacious in repairing, for example, a section of a concrete highway.

If a high compressive strength is not required, it is economically advantageous to decrease the amount of the reactive component and increase the amount of the inert aggregate component in the patching slurry.

EXAMPLE IX

A patching mortar composition was produced as described in Example I, using the following proportions:

| | Parts by Weight |
|---|---|
| $NH_4H_2PO_4$ | 4 |
| MgO | 3 |
| Graded silica | 93 |
| Water | 15 |

The graded silica used had the following grain sizing:

| | Percent |
|---|---|
| − 100 mesh | 32 |
| − 30 mesh | 18 |
| + 30 mesh | 38 |

The mortar slurry formed had a short working time. The compressive strength of samples cured for 4 hours was about 150 pounds per square inch.

EXAMPLE X

A patching mortar composition was produced as described in Example I, using the following proportions:

| | Parts by Weight |
|---|---|
| $NH_4H_2PO_4$ | 6 |
| MgO | 3 |
| Graded silica | 91 |
| Water | 15 |

The graded silica used had the same grain sizing as that used in Example IX.

The mortar slurry formed had a 13 minute working time. The compressive strength of samples cured for 4 hours was about 150 pounds per square inch.

EXAMPLE XI

A patching mortar composition was produced as described in Example I, using the following proportions:

| | Parts by Weight |
|---|---|
| $NH_4H_2PO_4$ | 24 |
| $Mg(H_2PO_4)_2$ | 10 |
| MgO | 15 |
| 100 mesh silica | 51 |
| Water | 22 |

The mortar slurry had a working time of about 4 minutes. The compressive strength of samples cured for 1/2 hour was 2,200 pounds per square inch.

EXAMPLE XII

Other acid phosphate salts react in a similar manner with magnesia to form the magnesium phosphate patching compositions of the instant invention. A magnesium phosphate composition of magnesia and mono magnesium phosphate, yielding approximately the same relative amounts of phosphate and magnesium ions was produced as described in Example I from the following components:

| | Parts by Weight |
|---|---|
| $Mg(H_2PO_4)_2$ | 20 |
| MgO | 5 |
| 30 to 40 mesh sand | 50 |
| 100 mesh silica | 25 |
| Water | 15 |

The above mortar slurry had a short working time. Samples were cured for 2 hours and 24 hours. The compressive strength of samples cured for 2 hours was about 410 pounds per square inch; the compressive strength of samples cured for 24 hours was about 850 pounds per square inch.

Phosphoric acid functions in the same manner as an acid phosphate salt, in reacting with magnesia to form a magnesium phosphate cement. However, the instant availability of the phosphate ion in the reaction mixture produces a very rapid reaction and hardening of the slurry composition. Because of this rapid set, the use of phosphoric acid in the method of the invention is impractical for most repairs.

EXAMPLE XIII

A patching mortar having the following composition was prepared as described in Example I from the following components:

| | Parts by Weight |
|---|---|
| $NaH_2PO_4$ | 15 |
| MgO | 10 |
| 30 to 40 mesh sand | 50 |
| 100 mesh silica | 25 |
| Water | 17 |

The mortar slurry formed had a short set time. Samples were cured at room temperature for periods of 2 hours and 24 hours. The samples cured for 2 hours had a compressive strength of about 1,000 pounds per square inch; the samples cured for 24 hours had a compressive strength of 2,500 pounds per square inch.

EXAMPLE XIV

A patching mortar composition was produced as in Example I, using the following proportions:

| | Parts by Weight |
|---|---|
| $NaH_2PO_4$ | 10 |
| MgO | 15 |
| 30 to 40 mesh sand | 50 |
| 100 mesh silica | 25 |
| Water | 17 |

The increase in the amount of MgO and decrease in the amount of $NaH_2PO_4$ present in the composition decreased the working time to less than 2 minutes. Such a rapid working time would only be useful when working with a small amount of the mortar slurry.

EXAMPLE XV

A patching mortar composition was produced as in Example I, using the following proportions:

| | Parts by Weight |
|---|---|
| $NaH_2PO_4$ | 20 |
| MgO | 5 |
| 30 to 40 mesh sand | 50 |
| 100 mesh silica | 25 |
| Water | 17 |

The decrease in the amount of MgO and increase in the amount of $NaH_2PO_4$ present in the composition produced a decrease in the compressive strength of the slurry. Samples cured for 2 hours and 24 hours developed very little compressive strength.

Examples XIII-XV show that although the total amounts of the acid phosphate salt and magnesia remain the same, varying the proportions of the reactive ingredients has a pronounced influence on the working time and the compressive strength of the patching composition.

The slurry compositions detailed hereinbefore which develop a high compressive strength at an early age also exhibit excellent bond strength to the material to which they are applied. The compositions and methods described in the Examples may be employed to repair such materials as concretes, mortars, wood, ceramics, plaster and the like. The composition selected will depend on the severity of the conditions to which the composition will be subjected. Thus, for example, if it is desired to use a composition having a compressive strength of greater than 3,000 pounds per square inch after curing for 1 hour, with a working time of about 10 minutes, the method and composition described in Example III would be selected. If a shorter reaction time and a lower compressive strength is desired, the method and composition of Example I would be appropriate. In a similar fashion, working time and compressive strength may be "tailored" to fulfill the requirements of any given application by proper adjustment of the proportion of reactive and inert aggregate component, the proportion of MgO and acid phosphate salt present in the reactive component, the identity of the acid phosphate salt, the temperature of the dry mix and water, and the bulk density of the MgO used. Repair of, for example, a wall or a ceramic object would not require a patching composition having the same working time and compressive strength required of a patching composition used in repairing a roadway.

COMPARATIVE PROCEDURE A

For purposes of comparison, but not in accordance with the method of the invention, a patching mortar composition was produced as described in Example I. The 100 mesh silica fraction of the inert aggregate was replaced with sand:

|  | Parts by Weight |
|---|---|
| $NH_4H_2PO_4$ | 15 |
| MgO | 10 |
| 30 to 40 mesh sand | 75 |

In the absence of the finer mesh silica fraction, the mortar produced above had little plasticity and was harsh and watery. The mortar tended to bleed upon setting. Apparently the finer mesh silica fraction functions as a "filler," and helps to eliminate voids between the larger sand particles used in the above slurry composition.

As discussed hereinbefore, by varying the "dead-burning" or calcining conditions, a "dead-burned magnesite" having a greater bulk density and a lower reactivity may be produced.

EXAMPLE XVI

A patching mortar composition was produced as described in Example III. The proportions are indicated below:

|  | Parts by Weight |
|---|---|
| $NH_4H_2PO_4$ | 15 |
| − 325 mesh fused MgO | 10 |
| 30 to 40 mesh sand | 50 |
| 100 mesh silica | 25 |
| NaCl | 3 |

The mortar slurry thickened rapidly and had a working time of 7 1/2 minutes. Samples cured for 2 hours had a compressive strength of 2,800 pounds per square inch.

EXAMPLE XVII

A patching mortar composition was produced as described in Example III. The proportions are indicated below:

|  | Parts by Weight |
|---|---|
| $NH_4H_2PO_4$ | 15 |
| − 325 mesh fused MgO | 12 |
| 30 to 40 mesh sand | 50 |
| 100 mesh silica | 23 |
| NaCl | 3 |

The mortar slurry formed had a working time of 7 1/2 minutes. Samples cured for 2 hours had a compressive strength of 3,250 pounds per square inch.

EXAMPLE XVIII

A patching mortar composition was produced as described in Example III. The proportions are indicated below:

|  | Parts by Weight |
|---|---|
| $NH_4H_2PO_4$ | 18 |
| − 325 mesh fused MgO | 12 |
| 30 to 40 mesh sand | 50 |
| 100 mesh silica | 20 |
| NaCl | 3 |

The mortar formed had a working time of 7 minutes. Samples cured for 2 hours had a compressive strength of 3,600 pounds per square inch.

A comparison of Example III and Examples XVI, XVII and XVIII illustrate the effect of the use of fused MgO. The fused MgO contained fine grains of MgO "flour" obtained from the grinding of the hard dense MgO. The presence of this fine grain MgO caused the slurry to thicken rapidly. Because of the lower reactivity of fused MgO, a lesser amount of cementitious magnesium phosphate was formed from the remaining MgO particles present in the reactive component. To increase the compressive strength to the range obtained in Example III, the amount of cementitious magnesium phosphate formed must be increased.

A substitution of a finer mesh sand, and addition of a greater amount of water to the composition hereinbefore described in the Examples, will produce a white inorganic paint having excellent bonding properties. Addition of from about 2.5 to 5.0 percent titanium dioxide will produce a paint having even a greater degree of whiteness; while addition of about 0.025 percent colloidal graphite and 0.0125 percent yellow ochre will produce a paint similar in color to most Portland cement concretes and mortars. Addition of other pigments may be used also to color the patching compositions described in the Examples.

What I claim is:

1. A method for repairing an area which comprises preparing a patching composition consisting essentially of:

a. from 7-50 parts by weight of a mixture of minus 100 mesh MgO particles having a bulk density of at least 50 pounds per cubic foot with an acid phosphate salt, b. from 93-50 parts by weight of an inert aggregate, substantially all of which is finer than 20 mesh, the relative proportions of said acid phosphate salt and of said MgO being such that reaction between the two forms a continuous cementitious phase substantially completely surrounding the remaining MgO particles and the inert aggregate of said MgO to form magnesium phosphate, and the particle sizing of said inert aggregate being such that the composition forms an aqueous slurry of workable consistency, and the relative proportion of the mixture of MgO particles and acid phosphate salt to the inert aggregate being sufficiently high that an aqueous slurry of the composition with sufficient water to provide a workable consistency is heated by exothermic heat of reaction to a temperature such that the slurry cures to a solid having adequate compressive strength at an early cure age, and c. sufficient water to provide a workable consistency, and applying the patching composition to the area.

2. A method as claimed in claim 1 wherein the composition applied further includes from 2 to 8 percent sodium chloride.

3. A method as claimed in claim 1 wherein from 10 to 60 parts by weight of a coarse stone aggregate is present in the composition applied.

4. A method as claimed in claim 1 in which the acid phosphate salt in the composition applied is selected from the group consisting of $NH_4H_2PO_4$, $NaH_2PO_4$, and $Mg(H_2PO_4)_2$.

5. A method as claimed in claim 1 in which the acid phosphate salt is $NH_4H_2PO_4$.

6. A method as claimed in claim 1 wherein from 20-30 parts by weight of said MgO and said acid phosphate salt and from 70-80 parts by weight of said inert aggregate are present.

* * * * *